United States Patent [19]
Rueppel et al.

[11] Patent Number: 5,600,725
[45] Date of Patent: Feb. 4, 1997

[54] DIGITAL SIGNATURE METHOD AND KEY AGREEMENT METHOD

[75] Inventors: Rainer A. Rueppel, Wetzikon, Switzerland; Kaisa Nyberg, Vienna, Austria

[73] Assignee: R3 Security Engineering AG, Aathal, Switzerland

[21] Appl. No.: 291,951

[22] Filed: Aug. 17, 1994

[30] Foreign Application Priority Data

Aug. 17, 1993 [EP] European Pat. Off. .............. 93113119

[51] Int. Cl.$^6$ ....................................................... H04L 9/30
[52] U.S. Cl. .............................................................. 380/30
[58] Field of Search ................................................ 380/30

[56] References Cited

U.S. PATENT DOCUMENTS

| | | | |
|---|---|---|---|
| 4,991,210 | 2/1991 | Chaum | 380/30 |
| 4,996,711 | 2/1991 | Chaum | 380/30 |
| 5,146,500 | 9/1992 | Mauer | 380/30 |
| 5,199,070 | 3/1993 | Matsuzaki et al. | 380/30 |
| 5,299,262 | 3/1994 | Brickell et al. | 380/30 |
| 5,299,263 | 3/1994 | Beller et al. | 380/30 |
| 5,347,581 | 9/1994 | Naccache et al. | 380/30 |
| 5,406,628 | 4/1995 | Beller et al. | 380/30 |
| 5,442,707 | 8/1995 | Miyaji et al. | 380/30 |

OTHER PUBLICATIONS

Proceedings of Crypto '89 1989, New York – C. Schnorr "Efficient Identification and Signatures for Smart Cards".
Computer – D. Davies "Applying the RSA Digital Signature to Electronic Mail".
Sun et al. An Efficient Probabilistic Public–Key Block Encryption and Signature Scheme Based on El–Gamal's Scheme.

*Primary Examiner*—Salvatore Cangialosi
*Attorney, Agent, or Firm*— Keck, Mahin & Cate

[57] ABSTRACT

A digital signature method based on the discrete logarithm problem is provided that allows message recovery. The message x is transformed according to the rule $e = x \, g^{-r} \bmod p$, where r is a secret value generated by the signer. A value y is then calculated according to the rule $y = r + s \, e \bmod q$, where y is the signer's secret key. The signature of x consists of the pair (e,y). The verifier recovers the message x according to the rule $x = g^y \, k^e \bmod p$, where k is the signer's public key. The validation of x can be based on some redundancy contained in x. Alternatively, a conventional verification equation can be constructed by using the signature method together with a hash function H. In addition, a key agreement method based on the signature method is provided which establishes with a single transmission pass a shared secret key K between two parties A and B in an authenticated fashion.

35 Claims, 2 Drawing Sheets

DIGITAL SIGNATURE METHOD AND KEY AGREEMENT METHOD

The invention relates to a method for generating and verifying a digital signature of a message. The field of this invention is data integrity and in particular generating and verifying a digital signature for a message or data file. The inventive method can also be used to establish a shared secret key between two parties.

The invention also relates to an apparatus for generating and/or verifying a digital signature.

When a message is transmitted from one party to another, the receiving party may desire to determine whether the message has been altered in transit. Furthermore, the receiving party may wish to be certain of the origin of the message. It is known in the prior art to provide both of these functions using digital signature methods. Several known digital signature methods are available for verifying the integrity of a message. These known digital signature methods may also be used to prove to a third party that the message was signed by the actual originator. Several attempts have been made to find practical public key signature schemes that are based on the difficulty of solving certain mathematical problems to make alteration or forgery by unauthorized parties difficult. Most of the proposed schemes have been based either on the problem of factoring large integers or on the difficulty of computing discrete logarithms over finite fields (or over finite groups in general). For example, the Rivest-Shamir-Adleman system depends on the difficulty of factoring large integers (see "A method for obtaining digital signatures and public key cryptosystems", Communications of the ACM, Feb. 1978, Vol. 21, No. 2, pp. 120–126).

In 1985, Taher El-Gamal proposed a signature scheme based on the discrete logarithm problem (see "A Public Key Cryptosystem and a Signature Scheme Based on Discrete Logarithyms," IEEE Trans. on Inform. Theory, Vol. IT-31, pp. 469–472, July 1985). In 1987, Chaum, Evertse and Van de Graaf proposed a zero-knowledge identification protocol based on the discrete logarithm problem. In 1989, Schnorr proposed a modification of that protocol to obtain an efficient identification and signature scheme (see C. P. Schnorr, "Efficient Identification and Signatures for Smart Cards", Proceedings of Crypto '89, Springer-Verlag 1990, pp. 239–252 and European Patent Application EP 0 384 475 A1). In 1991, the National Institute of Standards and Technology (NIST) proposed the "Digital Signature Method" that combines some features of El-Gamal's and Schnorr's schemes (see Worldwide Patent WO93/03562).

There are digital signature schemes that allow text recovery. That is, the original message can be recovered from the signature itself and thus it is unnecessary to send the message along with the signature. There are other signature schemes that do not allow text recovery but instead require the message or a hash value of the message in the verification process. All the described signature schemes based on the discrete logarithm problem have the property that the original message is no longer recoverable from the signature. With these systems, it is necessary to send the message along with the signature. While any signature system that allows text recovery can be converted into a signature system with text hashing, the converse is not true.

The goal of the present invention is therefore to provide an efficient digital signature method avoiding at least some of the disadvantages described above.

According to the present invention, there is provided a method for generating a digital signature e, y, of a message x, comprising the steps of a) providing a secret and random value r;
b) providing a public value g;
c) providing an element $u=g^{-r}$ in a group G having a cyclic subgroup S of order p-1 and a cyclic subgroup T of the subgroup S of order q where q divides p-1;
d) calculating the value e from said message x and said value u according to the rule $e = f(G(x),u)$ wherein G(x) is a value derived from said message x and the function f is such that G(x) can be calculated from e and u using a function $$H(u^{-1},e)=G(x)$$

e) calculating said value y proceeding from a value q selected to be a divisor of p-1 according to the rule $$ar+bs+c=0 \pmod{q}$$

where (a,b,c) is a permutation of the values e',y,1; and
where e' is an integer and is derived from e and where s is a secret value; and
f) transmitting said values e,y to a recipient.

This digital signature method can be used in both message recovery and message hashing mode. Clearly, when message recovery is possible, the original message need not be transmitted or stored together with the digital signature, which improves the efficiency of the transmission or the storage.

This method requires a pair of corresponding public and secret keys (k and s) for each signer.

In one preferred embodiment, the message x is transformed according to the rule $e=x\ g^{-r} \bmod p$, where r is a secret value generated by the signer. A value y is then calculated according to the rule $y=r+s\ e \bmod q$. The signature of x consists of the pair (e,y) and is then transmitted. The receiving party of the signature uses a retransformation process to recover the message x. The received signature (e,y) is transformed according to the rule $x=g^y\ k^e \bmod p$, thereby providing the original message x for legitimately executed signatures. The validation of x can be based on some redundancy contained in x. Alternatively, a conventional verification equation can be constructed by using a hash function H, transforming H(x) using the signature scheme and sending x along with the signature (e,y), recovering H(x) at the receiver using the retransformation equation and comparing it with the locally computed hash value of the received message x.

Such a signature system is also applicable to symmetric encryption systems to generate a common key.

According to a further aspect of the present invention, there is provided a method for establishing a shared secret key K between two parties A and B comprising the steps of:

a) providing to party A random integer R and calculating a message x by exponentiating a first public value to a power derived from R;
b) providing for parties A and B respective keys $k_A$, $k_B$ derived from respective private keys $s_A$, $s_B$ where $k_A=g^{-s_A}$ and where $k_B=g^{-s_B}$;
c) generating a digital signature e,y of said message x by:
   (i) providing a secret and random value r;
   (ii) providing an element $u=g^{-r}$ in a group G having a cyclic subgroup S of order p-1 and a cyclic subgroup T of the subgroup S of order q where q divides p-1;
   (iii) calculating the value e from said message x and said value u according to the rule $e=f(G(x),u)$ wherein G(x) is a value derived from said message x and the function f is such that G(x) can be calculated from e and u using a function $H(u^{-1}, e)=G(x)$; and (iv) calculating said value y proceeding from a value q selected to be a divisor of p-1 according to the rule $ar+bs_A+c=0 \pmod{q}$ where (a, b, c) is a permutation of the values e', y, 1, and where e' is an integer and is dervied from e and where $s_A$ is a secret value;

(d) transmitting the signature e,y from A to B;

(e) extracting the message x from the signature e,y by:

(i) deriving e' from e;

(ii) deriving the value $b'=a^{-1}b \pmod{q}$;

(iii) deriving the value $c'=a^{-1}c \pmod{q}$;

(iv) deriving the inverse in the group G of the value u from the relationship $u=k_A^{b'}g^{c'}$;

(v) reconstructing G(x) from $u^{-1}$ and e according to the rule $G(x)=h(u^{-1},e)$.

(f) generating at party B said shared secret key K by exponentiating the message x to a power derived from the private key $s_B$; and (g) generating at party A said shared secret key K by exponentiating to said power derived from R a second public value related to said first public value.

These key agreement methods establish with a single transmission pass a shared secret key K between two parties A and B in an authenticated fashion. It requires that both parties have a pair of corresponding public and secret keys ($k_A$, $s_A$ and $k_S$, $s_B$, respectively).

In one embodiment, Party A chooses a special key agreement message $x=g^R \mod p$, signs it using the above signature method and transmits the resulting signature (e,y) to party B. Party B recovers the key agreement message using the retransformation process of the signature method. With a little additional computation, both parties are now able to establish the shared key K. Party A computes $K=k_B^R \mod p$ and party B computes $K=(g^R)^{-s_b} \mod p$. Both arrive at the same value K since $k_s=g^{-s_b} \mod p$.

In another embodiment, it is possible to sign x where $x=k_s^R$ and compute a shared key $g^R$.

Clearly, when text recovery is possible, the original message need not be transmitted or stored together with the digital signature, which allows to improve the efficiency of the transmission or the storage. Finally, a signature system with text recovery can always be run in text hashing mode without loss of efficiency, when the application demands signatures with text hashing.

Other advantages and applications of the inventive method will become apparent from the following description of preferred embodiments, wherein reference is made to the following figures, in which FIG. 1 shows the signer's part of the digital signature method of the present invention;

Figure 2:
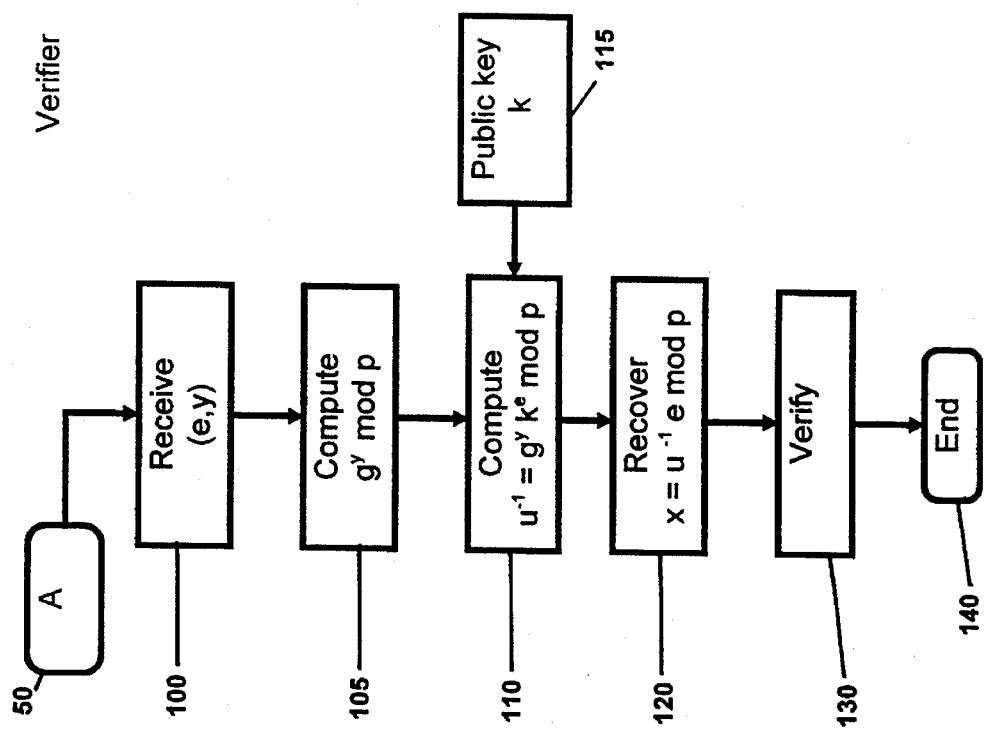
FIG. 2 shows the verifier's part of the digital signature method of the present invention.
Figure 1:
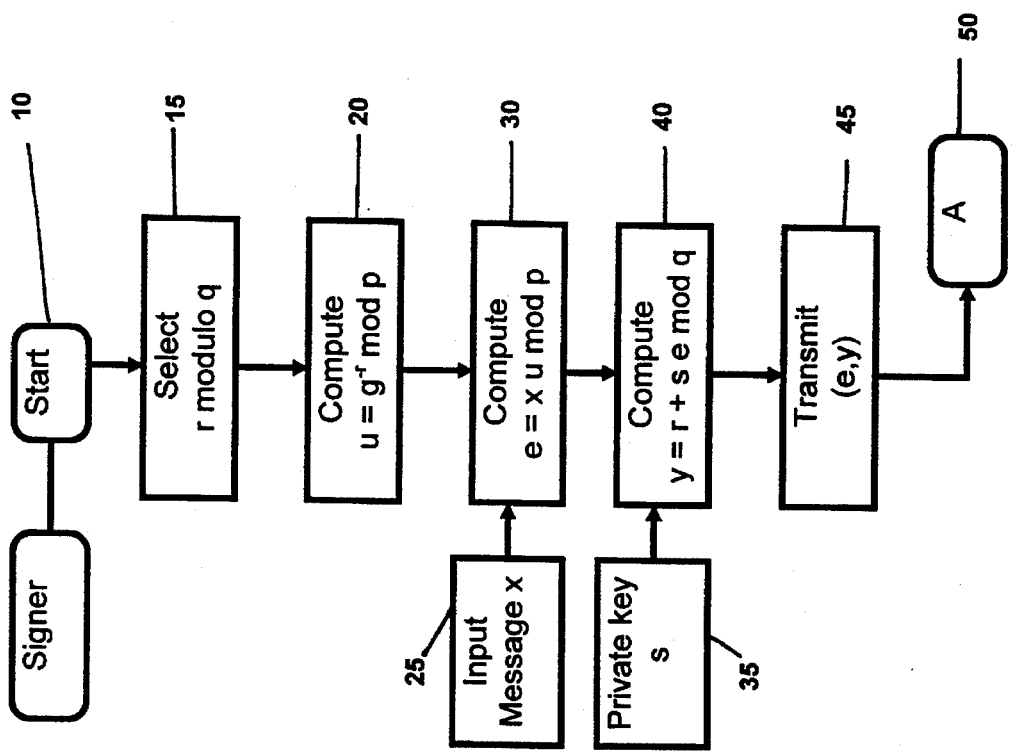

Referring now to FIGS. 1 and 2 where the digital signature method is shown, within the preferred digital signature method of the present invention, each user has to obtain three numbers p, q and g. The value p is a large prime modulus with $p>2^{512}$, the value q is a large prime divisor of (p-1), and the value g is an element of multiplicative order q modulo p. That is, $g^t=1 \mod p$ if and only if t is an integer multiple of q. The triple (p,q,g) may be common to all users of the signature method, or may be chosen by each user independently.

The execution of the signature method begins at start terminal 10.

For every message a user wishes to sign, the user first selects secretly and randomly an integer r such that $0<r<q$ (block 15).

Then, in block 20 the value $u=g^r \mod p$ is calculated.

Block 25 denotes the input message x. In order to be recoverable by the receiver, the message x must be an integer between 0 and p. If the original message is larger than p, it can be subdivided into data blocks of size smaller than p. It is known in the art how to convert a message into a block representation where each block has a size smaller than some given integer value.

In block 30, the message x is transformed into value e using the equation $$e = x \, u \mod p$$

where u is the quantity already computed in block 20. Since the value u does not depend upon the message, it can be computed prior to knowledge of the message x. In general, e may be computed as $e=f(x,u)$ where the function f has the property that, given the values e and u, then the message x is easily recovered. One such function f is the multiplication of x times u modulo p shown in block 30. Other examples of such a function are $e=x+u \mod p$ and $e=x$ xor $u$, where xor denotes the bitwise addition of x and u.

Block 35 denotes the private signature key s of the signer, where $0<e<q$. The value of s is secretly chosen in advance to the execution of the signature method. It may be selected by the signer itself or by some trusted party which conveys s in a secret and authenticated way to the signer. The private signature key s is fixed for all messages to be signed by the signer.

The signature method proceeds to block 40, where the value of y is determined according to the rule $$y = r+se \mod q$$

The values e (determined in block 30) and y (determined in block 40) constitute the signature of message x. They are transmitted to the recipient as shown in block 45.

The connector 50 denotes the finishing of the signer's part and serves as reference for the continuation of the signature method at the recipient, i.e. the verifier.

After receiving the signature (e,y), as indicated in block 100, the recipient must recover the message x and verify the signature. For that purpose, the recipient must know the values g, p and q used by the signer.

In block 105, the verifier computes the quantity $g^y \mod p$.

Block 115 denotes the signer's public key k, which corresponds to the private signature key s through the rule $k=g^{-s} \mod p$. This public key k and the identity of the signer must be made available in an authenticated fashion to the recipient of the signature (e,y). By possession of the public key k of the signer, the verifier can then determine that the signature was originally created by that user who had knowledge of the private key s which corresponds to the particular value of k. If s has not been compromised, the signer's identity is linked to the public key y in an authenticated fashion.

In block 110, the verifier computes, using the signer's public key k, the inverse of the value u using the equation $$u^{-1} = g^y \, k^e \mod p$$

In block 120, the verifier recovers the message x using the equation $$x = u^{-1} e \bmod p \qquad (1)$$

Block 120 shows the recovery operation when the function f to compute e from x and u was chosen to be multiplication modulo p (see block 30). The recovery transformation (1) will vary depending upon the function f chosen for the calculation of e. For example, if f was chosen to be $e = x + u \bmod p$, then the recovery transformation (1) becomes $x = e - (u^{-1})^{-1} \bmod p$. Or, if f was chosen to be $e = x$ xor $u$, then the recovery transformation (1) becomes $x = e$ xor $(u^{-1})^{-1}$.

If the digital signature (e,y) was a genuine one and was received by the recipient in an unmodified or undistorted way, then equation (1) yields the correct value of the message x. If, however, the digital signature received was a forged one or was modified or distorted in any way during the transmission, then equation (1) will yield a different value x'. It will be understood by one skilled in the art that, by the nature of the retransformation equation (1), any redundancy contained originally in x will no longer be accessible in x'. Therefore, if immediate verification of the signature is desired, the verifier must inspect (block 130) the message x for the redundancy contained in it. The redundancy may be natural (for example, caused by the language in use) or artificial (for example, by some formatting rules imposed on x or by addition of some check values). If the redundancy check is successful, then the signature and the contained message x are accepted by the verifier as genuine. If the redundancy check fails, then the signature and the contained message x are rejected.

It will be understood by one skilled in the art that the present invention can also be used in what is called the hashing mode. Then, instead of transforming the message x itself to yield the quantity e (as indicated in block 30), a hash value H(x) of the message x is used for the computation. A hash function H takes an arbitrary length message as input and yields a fixed length hash value as output. The hash value H(x) must now satisfy the requirement $0 < H(x) < p$, and x may have arbitrary length. The value of e is now determined as $$e = H(x) \, u \bmod p$$

and in block 45 the message x has to be transmitted along with the signature, i.e. the triple (x,(e,y)) has to be transmitted to the recipient. The hash function H must be collision-resistant for the signature method to retain its qualities in hashing mode. That is, it must be computationally infeasible to find two messages x and x' such that $M(x) = H(x') \, g^t \bmod p$ for an arbitrary integer t.

The verifier proceeds as described until it recovers H(x) in block 120 (instead of x). To verify the signature, the verifier now applies the hash function H to the received message x and compares it with the recovered hash value from block 120. If both hash values are equal, the signature is accepted; if the two hash values differ, the signature is rejected.

It will be understood by one skilled in the art that the signs of certain values can be changed without changing the subject matter of this signature method. For example, the sign of the value r may be inverted such that in block 20, the value u is calculated according to the rule $u = g^r \bmod p$ and in block 40 the value y is calculated according to the rule $y = -r + se \bmod q$. Similarly, the sign of the value s may be inverted such that in block 40 the value y is calculated according to the rule $y = r - se \bmod q$ and in block 115 the public key k is congruent to $g^s \bmod p$.

Figure 3:
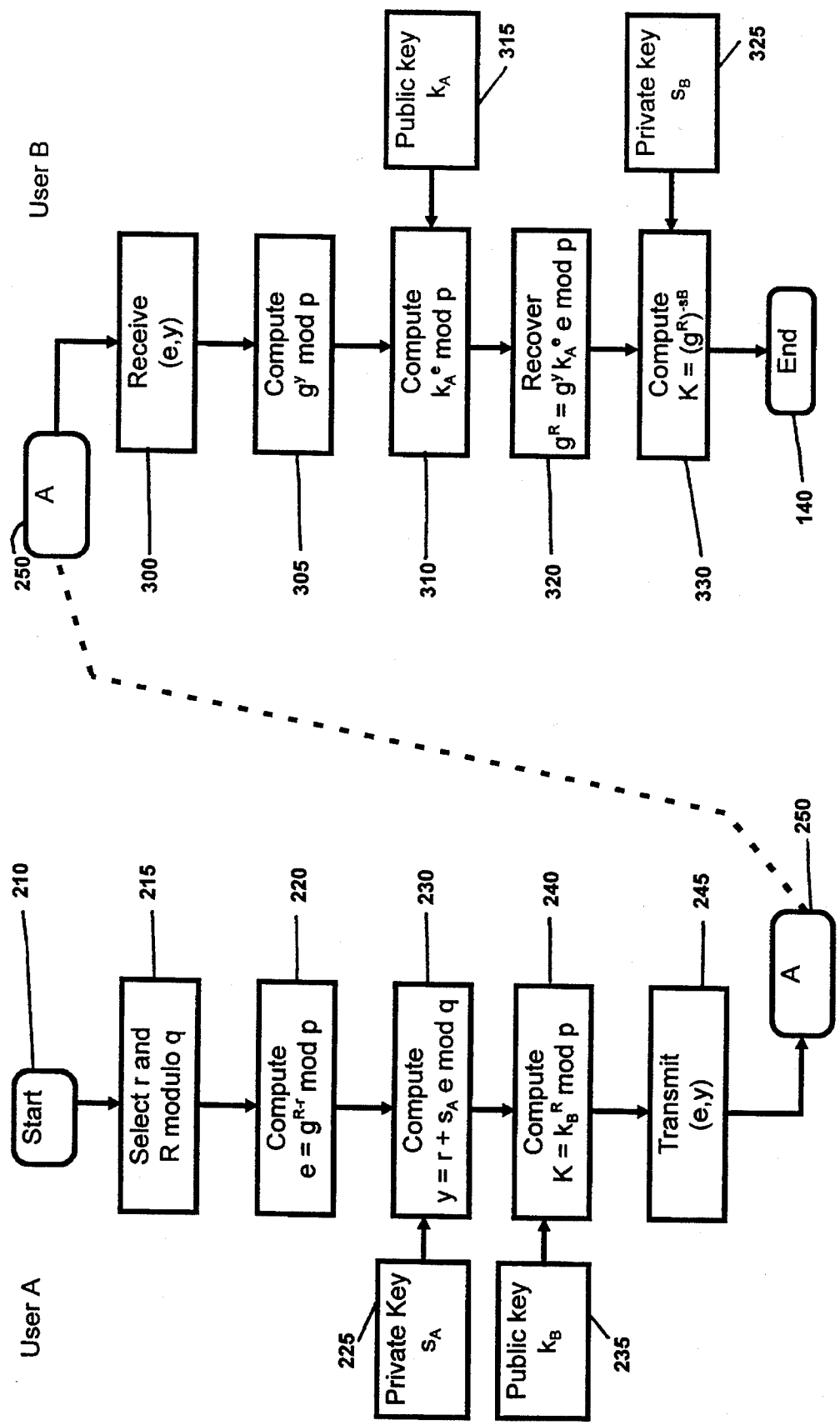
FIG. 3 shows one of the key agreement protocols based on the signature method of the present invention.

Referring now to FIG. 3, there is shown one of the key agreement methods of the present invention. For this key agreement method, the two users A and B who wish to establish a shared secret key must use a common set of values p, q, and g as described in the signature method of the present invention.

The execution of the key agreement method begins at start terminal 210.

User A first selects secretly and randomly two integers R and x such that $0 < R$, $r < q$ (block 215).

Then in block 220, the value $e = g^{R-r} \bmod p$ is calculated.

Block 225 denotes the private key agreement key $s_A$ of user A, where $0 < s_A < q$. The value of $s_A$ is secretly chosen in advance to the execution of the key agreement method. It may be selected by user A itself or by some trusted party which conveys $s_A$ in a secret and authenticated way to user A. The private key agreement key $s_A$ is fixed for all executions of the key agreement method.

The key agreement method proceeds to block 230, where the value of y is determined according to the rule $$y = r + s_A e \bmod q$$

Block 235 denotes user B's public key agreement key $k_B$ corresponding to the private key agreement key $k_B$ through the rule $k_B = g^{-s_B} \bmod p$. User B's identity and public key $k_B$ must be made available in an authenticated fashion to user A.

The key agreement method proceeds to block 240, where the value of the shared secret key K is determined according to the rule $$K = k_s^B \bmod p.$$

The values e (determined in block 220) and y (determined in block 230) constitute the key agreement token. They are transmitted to the recipient as shown in block 245.

The connector 250 denotes the finishing of user A's part and serves as reference for the continuation of the key agreement method at the recipient, i.e. user B.

After receiving the key agreement token (e,y), as indicated in block 300, the recipient B must recover the value $g^R \bmod p$ and compute the shared secret key K.

In block 305, the verifier computes the quantity $g^Y \bmod p$.

Block 315 denotes user A's public key agreement key $k_A$ corresponding to the private key agreement key $S_A$ through the rule $k_A = g^{-s_A} \bmod p$. User A's identity and public key $k_A$ must be made available in an authenticated fashion to user B.

In block 310, the recipient B computes, using the sender's public key $k_A$, the quantity $k_A^e \bmod p$.

In block 320, the recipient B recovers the value $g_R \bmod p$ using the equation $$g^R = g^Y \, k_A^e \bmod p$$

Block 325 denotes the private key agreement key $s_B$ of user B, where $0 < s_B < q$. The value of $s_B$ is secretly chosen in advance to the execution of the key agreement method. It may be selected by user B itself or by some trusted party which conveys $s_B$ in a secret and authenticated way to user B. The private key agreement key $s_B$ is fixed for all executions of the key agreement method.

The key agreement method proceeds to block 330, where the value of the shared secret key K is determined according to the rule $$K=(g^R)^{-S_B} \bmod p$$

Note that the same key K results from different computations at the sender A and at the recipient B, since $$\begin{aligned} K &= k_B{}^R \bmod p \\ &= g^{-s_B R} \bmod p \\ &= (g^R)^{-s_B} \bmod p \end{aligned}$$

The key K is only known to the sender A and the receiver B since at both sides a secret value was used: sender A used the secret value R and recipient B used the secret value $s_B$. The key K is also authenticated to both sender and recipient, since the key token (e,y) transmitted from A to B was actually A's signature of the message $g_R$ mod p and since B used the private key agreement key $s_B$ to compute the shared key K.

It will be understood by one skilled in the art that the signs of certain values can be changed without changing the subject matter of this key agreement method. For example, the sign of the value r may be inverted such that in block 220, the value e is calculated according to the rule $e=g^{R+r}$ mod p and in block 230 the value y is calculated according to the rule $y=-r+s_A e$ mod q. Similarly, the sign of the value R may be inverted such that in block 220 the value e is calculated according to the rule $e=g^{-R-r}$ mod p; in block 240 the value K is calculated according to the rule $K=k_B{}^{-R}$ mod p; in block 320 the value $g^{-R}$ mod p is recovered; and in block 330 the value K is calculated according to the rule $K=(g^R)^{-S_B}$. Also similarly, the signs of the private keys $s_A$ and $s_B$ may be inverted such that in block 230 the value is calculated according to the rule $y-r-s_A e$ mod q; in block 330 the value K is calculated according to the rule $K=(g^R)^{-S_B}$; and in blocks 235 and 315, A's and B's public keys $k_A$ and $k_B$ are chosen to be congruent to $g^{SA}$ mod p and $g^{SB}$ mod p, respectively. All these sign changes are independent of each other. They can be combined as desired.

The signature method and the key agreement method have been described in the context of a finite field defined by arithmetic modulo p, also called the Galois Field with p elements and denoted GF(p). In the multiplicative group of GF(p), the discrete logarithm problem is difficult to solve. It will be understood by one skilled in the art that there are other cyclic groups which can equivalently be used as the basis for the present invention. For example, the extension field $GF(p^n)$ defined by arithmetic modulo an irreducible polynomial of degree n with coefficients modulo p or the group defined by an elliptic curve over a finite field could be used as the basis for the present invention. In principle, any cyclic group in which the discrete logarithm problem is difficult to solve may serve as a basis for the present invention.

In the above embodiment, the group G is selected to be a set of non-zero elements in the integers mod p where p is a prime. In general, however, the group G should be selected to have a cyclic subgroup S of order p-1 and the cyclic subgroup S should itself have a cyclic subgroup T of order q where q divides p-1.

Similarly, the signature algorithm and verification procedure may be generalized such that the value y should be calculated from the relationship $$ar+bs+c=0 \;(\bmod\; q)$$

where a, b, c, is a permutation of the values e', y, 1. The value e' is an integer derived from e and in many cases will correspond to e. In general, e=f(G(x)u), where G(x) is a value derived from said message x and the function f is such that G(x) can be calculated from e and u using a function $H(u^{-1}, e)=G(x)$. Alternatively, it could be a hash value of e.

In the preferred embodiment, a has the value 1, and b has the value e', so that $$y=r+se' (\bmod\; q)$$

A particularly beneficial method is provided where both G(x) and u are integers and e is computed according to the relationship $$e=G(x)\cdot u \;(\bmod\; t)$$

where t is itself an integer greater than G(x). This permits the signature of messages of arbitrary length.

It will also be apparent that u could be treated as the key for a symmetric encryption algorithm so that e would be the encryption of G(x) under the key u. For example, the symmetric algorithm might be chosen to be the data encryption standard (DES) or triple DES or IDEA.

In the example provided above, the message is restricted to being less than p and the group G and subgroup S are coterminous, i.e. they are identical. Where the group to be used to implement signature and verification is to be the group formed from the points on the elliptic curve over a finite field, then both G(x) and u may be points on the elliptic curve and e may be derived by multiplying G(x) and u in the group to provide an additional point on the curve (it being understood that "multiplication" refers to the operation of the group).

Where u is a point on the elliptic curve, u could be represented as a pair (a,b) where both a and b come from the underlying finite field. In this case, e may be derived by treating G(x) as a field element and multiplying G(x) with one of the ordinates a or b in the finite field.

Alternatively, the value e may be derived by XORing a binary representation of G(x) with a binary representation of u.

For verification in the general case discussed above, it will of course be necessary to derive b' and c' where $$b'=a^{-1}b \;(\bmod\; q)$$

$$\text{and } c'=a^{-1}c \;(\bmod\; q)$$

in order to derive the inverse of u and reconstruct G(x). In the general case, $u=k^{b'}g^{c'}$ from which $u^{-1}$ can be derived.

The key exchange protocol described above may also be generalized to an arbitrary finite group. A selects a random integer R and calculates $g^R$. Using one of the signing schemes described above, user A signs $g^R$ to get signature y,e and transmits it to B. B recovers $g^R$ for the signature y,e. Under B computes $(g^R)^{-S_B}$ where $S_B$ is his private value. A recovers the public value $k_B$ (which has been computed as $g^{-s_B}$) and computes $(k_S)^R$, hence establishing the common element as $(k_B)^R=(g^R)^{-S_B}$.

As an alternative key exchange protocol, user A selects a random value R and computes the message x as $(k_B)^R$. Using one of the signing schemes described above, user A signs $(k_B)^R$ to obtain signature (y,e). User B recovers the message $x=(k_S)^R$ from (y,e). From user B's private value $S_B$, user B derives $(S_B)^{-1}$ and computes $(k_B)^{-Rs_B{-1}}$ which is equal to $g^R$. User A computes $g^R$ also to provide the common key $g^R$.

The inventive signature method and the key agreement method can be implemented in software and/or hardware by one skilled in the art. For example, an apparatus can be provided for creating the signature of a given message and transferring it to a second apparatus for verifying and retrieving the message.

Although the present invention has been shown and described with respect to specific preferred embodiments and variants thereof, it will be apparent that changes and modifications can be made without departing from what is regarded as the subject matter of this invention.

We claim:

1. A method for generating a digital signature e, y, of a message x, comprising the steps of
    a) providing a secret and random value r;
    b) providing a public value g;
    c) providing an element $u=g^{-r}$ in a group G having a cyclic subgroup S of order p-1 and a cyclic subgroup T of the subgroup S of order q where q divides p-1;
    d) calculating the value e from said message x and said value u according to the rule e=f(G(x),u) wherein G(x) is a value derived from said message x and the function f is such that G(x) is able to be calculated from e and u using a function $H(u^{-1},e)=G(x)$;
    e) calculating said value y proceeding from a value a selected to be a divisor of p-1 according to the rule $$ar+bs+c=0 \pmod{q}$$

where (a,b,c) is a permutation of the values e',y, 1; and where e' is an integer and is derived from e and where s is a secret value; and
    f) transmitting said values e, y to a recipient.

2. A method according to claim 1 wherein a=1 and b=e' so that the value y is calculated according to the rule y=r+se' mod q.

3. A method according to claim 1 wherein G(x) is a hash value H(x) generated by applying a hash function H to said message x.

4. A method according to claim 1 wherein e' is a hash value of e.

5. A method according to claim 1 wherein both G(x) and u are represented as integers and e=G(x)·u (mod t), where t is an integer greater than G(x).

6. A method according to claim 5 wherein u represents a key for a symmetric encryption algorithm whereby e is the encryption of G(x) under the key u.

7. A method according to claim 6 wherein said symmetric encryption algorithm implements the data encryption standard (DES).

8. A method according to claim 5 wherein the group G is the set of non-zero elements in the integers mod p where p is a prime number.

9. A method according to claim 8 wherein the cyclic subgroup S and the group G are coterminous.

10. A method according to claim 9 wherein the value e=f(G(x),u) is given G(x)·u mod p, and the value $h(u^{-1},e)$ is given by $u^{-1} \cdot e$ mod p.

11. A method according to claim 9 wherein the value of e is given by G(x)+u mod p and the value $h(u^{-1}, e)$ is given by e−u mod p.

12. A method according to claim 11 wherein the value e is given by G(x)• u and $h(u^{-1},e)$ is given by $e \oplus u$ where $\oplus$ represents an XOR function.

13. A method according to claim 8 wherein G(x) corresponds to x.

14. A method according to claim 1 wherein the cyclic subgroup S is a subgroup of the group of points of an elliptic curve over a finite field.

15. A method according to claim 14 wherein both G(x) and u are points on the elliptic curve.

16. A method according to claim 15 wherein e is derived by multiplying G(x) and u in the group to provide an additional point on the curve.

17. A method according to claim 14 wherein u is a point on the curve represented by a pair of coordinates (a,b) where both a and b come from the underlying finite field and e is derived from multiplying G(x) with one of the coordinates a or b in the finite field.

18. A method according to claim 14 wherein the value e is given by XORing a binary representation of G(x) with a binary representation of u.

19. A method of verifying a digital signature e,y of a message x which has been generated by
    a) providing a secret and random value r;
    b) providing a public value g;
    c) providing an element $u=g^{-r}$ in a group G having a cyclic subgroup S of order p-1 and a cyclic subgroup T of the subgroup S of order q where q divides p-1;
    d) calculating the value e from said message x and said value u according to the rule e=f (G(x)),u) wherein G(x) is a value derived from said message x and the function f is such that G(x) is able to be calculated from e and u using a function $H(u^{-1},e)=G(x)$; and
    e) calculating said value y proceeding from a value q selected to be a divisor of p-1 according to the rule ar+bs+c=0 (mod q) where (a,b,c) is a permutation of the values e', y, 1 and where e' is an integer and is derived from e and where s is a secret value, said method verification comprising
    f) receiving said signature e,y;
    g) deriving e' from e;
    h) deriving the value $b'=-a^{-1}b \pmod{q}$;
    i) deriving the value $c'=a^{-1}b \pmod{q}$;
    j) deriving the inverse of the group G of the value u from the relationship $u=lk^{b'}g^{c'}$, where $k=g^{-B}$ and S is a secret value;
    k) reconstructing G(x) from $u^{-1}$ and e according to the rule $G(x)=h(u^{-1},e)$;
    l) examining G(x) to verify the presence of a predetermined characteristic; and
    m) detecting the validity of the signature upon said predetermined characteristic not being found.

20. The method of claim 19 wherein the value of a=1 and b=e' so that y=r+se' (mod q) and the value of u is derived from the relationship $u^{-1}=g^y k^{e'}$.

21. The method of claim 19 wherein said predetermined characteristic includes a redundancy in the message x.

22. The method of claim 20 wherein said redundancy is natural.

23. The method of claim 20 wherein said redundancy is inserted.

24. The method of claim 21 wherein G(x) corresponds to the message x.

25. The method of claim 19 wherein G(x) is a hash value H(x) computed by applying a hash function H to said message x and said predetermined characteristic is a value obtained by applying H to the message x.

26. The method according to claim 19 wherein the group G is a set of non-zero elements in the integers mod p where p is a prime number.

27. A method according to claim 26 wherein the value e=f(G(x),u) is given by G(x).u mod p and the value $h(u^{-1},e)$ is given by $u^{-1} \cdot e$ mod p.

28. A method according to claim 27 wherein the value of e is given by G(x)+u mod p and the value h(u⁻¹,e) is given by e−u mod p.

29. A method according to claim 28 wherein the value e is given by XORing a binary representation of G(x) with a binary representation of u and h(u⁻¹,e) is given by XORing a binary representation of e with a binary representation of u.

30. A method according to claim 29 wherein the cyclic subgroup S is a subgroup of a group of points of an elliptic curve over a finite field.

31. A method for establishing a shared secret key K between two parties A and B comprising the steps of:

a) providing t party A random integer R and calculating a message x by exponentiating a first public value to a power derived from R;

b) providing for parties A and B respective keys $k_A, k_B$ derived from respective private keys $S_A, S_B$ where $k_A = g^{-SA}$ and where $k_B = g^{-AB}$;

c) generating a digital signature e, y of said message x by:
   i) providing a secret and random value r;
   (ii) providing an element $u = g^{-r}$ in a group G having a cyclic subgroup S of order p-1 and a cyclic subgroup T of the subgroup S of order q where q divides p-1;
   (iii) calculating the value e from said message x and said value u according to the rule e−f(G(x), u) wherein G(x) is a value derived from said message x and the function f is such that G(x) is able to be calculated from e and u using a function H(u⁻¹,e)= G(x); and
   (iv) calculating said value y proceeding from a value q selected to be a divisor of p-1 according to the rule $ar + bS_A + c = 0 \pmod q$ where (a,b,c) is a permutation of the values e',Y,l; where e' is an integer and is derived from e and $S_A$ is a secret value;

(d) transmitting the signature e,y from A to B;

(e) extracting the message x from the signature e,y by:
   (i) deriving e' from e;
   (ii) deriving the value $b' = a^{-1}c \pmod q$;
   (iii) deriving the value $c' = a^{-1}c \pmod q$;
   (iv) deriving the inverse in the group G of the value u from the relationship $u = k_A^{b'} g^{c'}$;
   (v) reconstructing G(x) from u⁻¹ and e according to the rule G(x)=h(u⁻¹,e), (f) generating at party B said shared secret key K by exponentiating the message x to a power derived from the private key $S_B$; and (g) generating at party A said shared secret key K by exponentiating to said power derived from R a second public value related to said first public value.

32. A method according to claim 31 wherein said first public value is g and said second public value is $k_B$.

33. A method according to claim 32 wherein x is computed by exponentiating g to the power R such that $x = g^R$.

34. A method according to claim 31 wherein said first public value is said public key $k_B$ and said second public value is g.

35. A method according to claim 34 wherein x is computed by exponentiating $k_B$ to the power R such that $x = k_B$.

* * * * *